United States Patent [19]

McQuestion

[11] E Re. 29,114

[45] Reissued Jan. 18, 1977

[54] BURIAL VAULT

[76] Inventor: James H. McQuestion, 4460 Coral Drive, Brookfield, Wis. 53005

[22] Filed: Sept. 29, 1975

[21] Appl. No.: 617,302

Related U.S. Patent Documents

Reissue of:

[64] Patent No.: 3,839,768
Issued: Oct. 8, 1974
Appl. No.: 341,688
Filed: Mar. 15, 1973

[52] U.S. Cl. ..... 27/35; 52/135
[51] Int. Cl.[2] ..... A61G 17/00
[58] Field of Search ..... 27/3, 7, 35; 52/128–142; 161/89

[56] References Cited

UNITED STATES PATENTS

| | | | |
|---|---|---|---|
| 1,839,149 | 12/1931 | Haase | 27/35 |
| 2,927,453 | 3/1960 | Patterson | 27/35 X |
| 3,130,520 | 4/1964 | Neuman | 52/135 |
| 3,429,094 | 2/1969 | Romualdi | 161/89 |
| 3,439,461 | 4/1969 | Chandler | 52/139 |
| 3,464,171 | 9/1969 | Chandler | 52/128 X |

*Primary Examiner*—John D. Yasko
*Attorney, Agent, or Firm*—Ronald E. Barry

[57] ABSTRACT

A burial vault having preformed hollow fiberglass resin base and cover shells, the shells having fiberglass anchor loops integrally formed on their inner surfaces. The shells are filled with a cement-sand-stone composition that is mechanically locked to the anchor loops on the inside surface of the liners, the cement-sand-stone composition including a plurality of straight steel wires of short length randomly disposed throughout the walls to increase the tensile strength and crack-resistance of the vault.

6 Claims, 14 Drawing Figures

BURIAL VAULT

Matter enclosed in heavy brackets [ ] appears in the original patent but forms no part of this reissue specification; matter printed in italics indicates the additions made by reissue.

BACKGROUND OF THE INVENTION

Burial vaults have commonly been made of a cement composition which is known to be pervious to water. Various types of lining materials have been used to seal the vaults in order to make them impervious to water. Special handling techniques and special bonding materials have been required in order to make this type of a vault. The cement composition vaults also are subject to considerable pressure from the surrounding soil after they have been placed in the ground and require reinforcement in order to prevent collapse of the vault. Efforts to increase the strength of the concrete vaults have been directed to the inclusion of reinforcing wires within the cement composition as well as the use of metallic liners both on the inside and outside of the vault. However, it is generally known that metallic materials are subject to chemical attack from the materials in the surrounding soil and have a relatively short life.

One of the most recent attempts to provide a burial vault having the capability of being impervious to water is shown in the Chandler patent 3,439,461, issued on April 22, 1969 entitled "Burial Vaults". This type of a vault is generally formed by casting the cement composition into the space between the inner liner and the outer mold. An adhesive bonding material is precoated on the inner surfaces of the liner and the cement composition added while the adhesive material is still wet and tacky. Special bonding materials have been used in order to obtain a satisfactory bond between the liner and the cement composition. Although this type of a vault provides a water-tight enclosure and protection from chemical attack, the special handling techniques and adhesive material add to the overall cost.

SUMMARY OF THE INVENTION

The burial vault of the present invention provides a simplified means of manufacturing a burial vault having increased tensile strength and crack-resistance as well as being impervious to water and protected from chemical attack on the exterior surface as well as interior, from the surrounding environment. The base and cover are made in the form of hollow fiberglass resin shells preformed to the desired configuration. The inner surface of the shells are provided with integral fiberglass anchor loops which become embedded in the cement-sand-stone composition. The crack-resistance and strength of the burial vault is increased by incorporating short steel wires, randomly in the cement-sand-stone composition prior to pouring the composition into the base and cover shells.

Other objects and advantages will become apparent from the following description when read in connection with the accompanying drawings.

DRAWINGS

DESCRIPTION OF THE INVENTION

Figure 1:
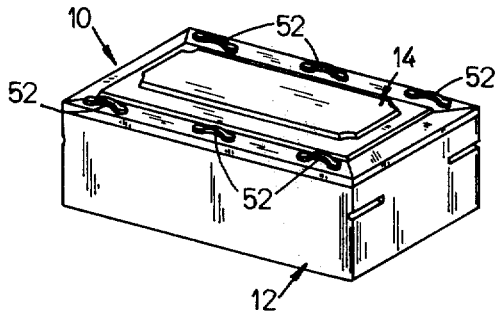
FIG. 1 is a perspective view of a burial vault formed according to the invention.
Figure 2:
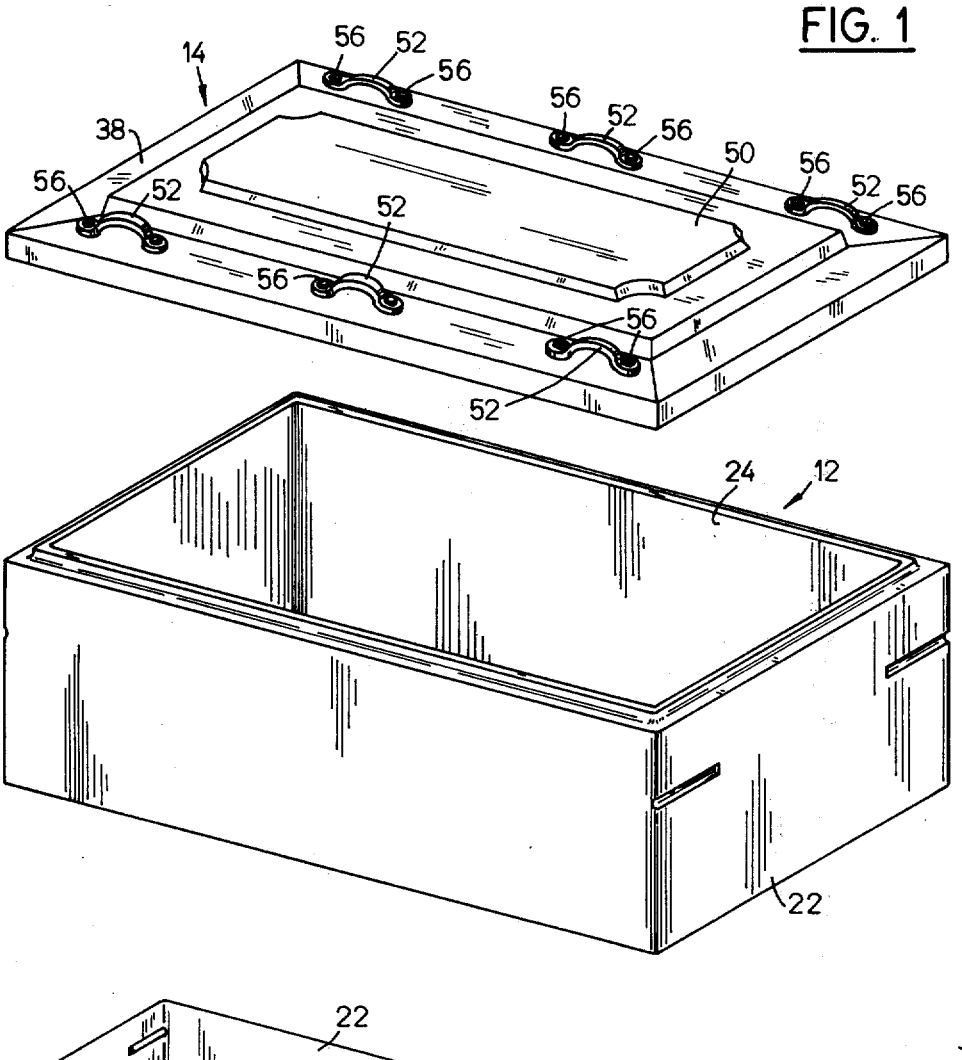
FIG. 2 is a perspective view of the burial vault of this invention with the cover shown spaced from the base.
Figure 3:
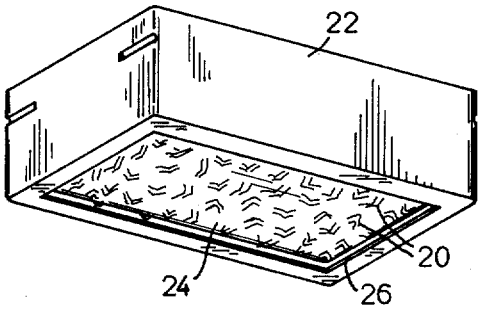
FIG. 3 is a perspective view of the bottom of the base shell shown prior to filling with the cement-sand-stone composition.
Figure 4:
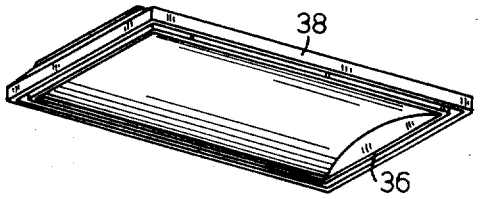
FIG. 4 is a perspective view of the bottom of the cover shell.
Figure 5:
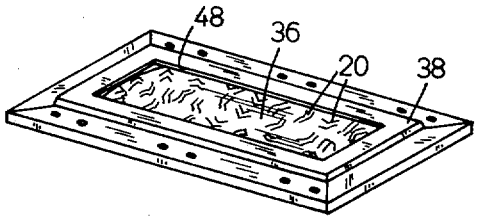
FIG. 5 is a perspective view of the top of the cover shell showing the filling opening.
Figure 6:
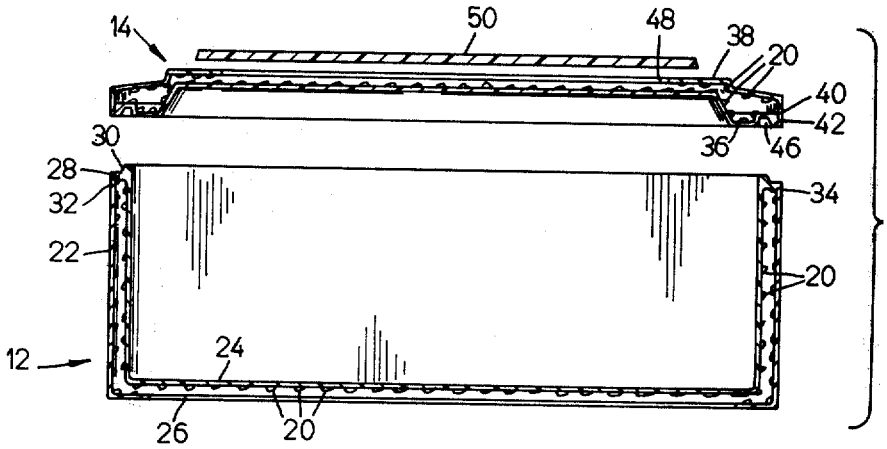
FIG. 6 is a side elevation view in section of the cover shell and base shell.
Figure 7:
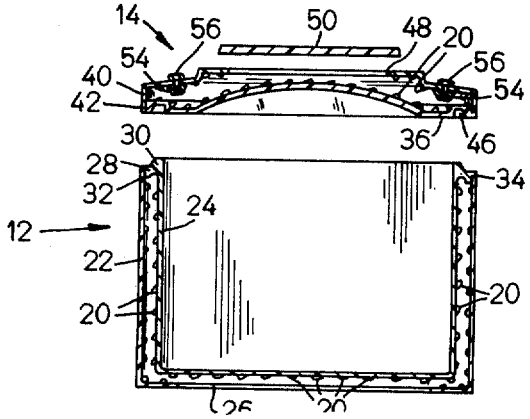
FIG. 7 is an end elevation view in section of the cover shell and base shell.

The burial vault 10 of the present invention includes a base 12 and a cover 14. The base 12 and cover 14 are preformed as hollow plastic fiberglass shells which are filled with a cement-sand-stone composition 16 to provide the requisite strength. A pluraity of short steel wires 18 can be intermingled within the cement-sand-stone composition prior to pouring to increase the strength of the vault. The burial vault 10, when formed, is impervious to water and has increased tensile strength and high crack-resistance, due to the use of the plastic fiberglass resin liners.

BURIAL VAULT BASE

Figure 8:
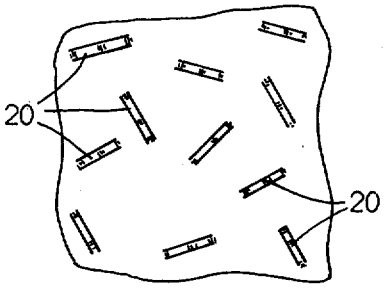
FIG. 8 is an enlarged view of the surface of one of the wall panels showing the anchoring loops formed in the surface of the panel.
Figure 9:
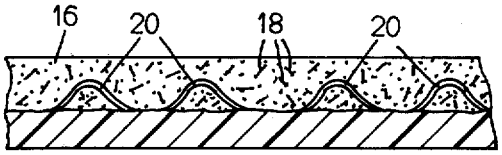
FIG. 9 is an enlarged end view of the wall panel showing the anchoring loops embedded in the cement-sand-stone composition.
Figure 10:
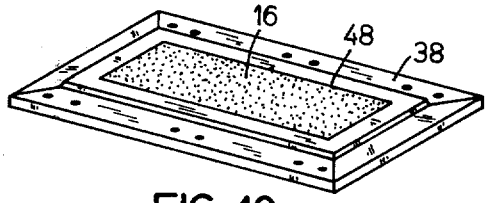
FIG. 10 is a perspective view of the top of the cover shell after filling with the cement-sand-stone composition.
Figure 11:
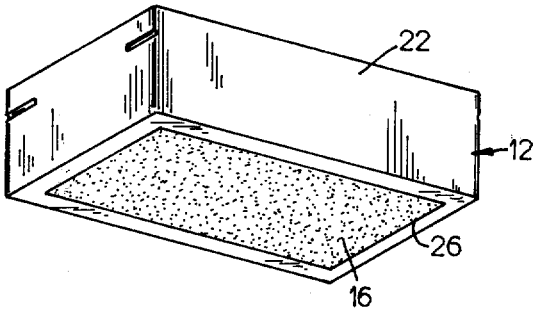
FIG. 11 is a perspective view of the shell shown from the bottom after filling with the cement-sand-stone composition.
Figure 12:
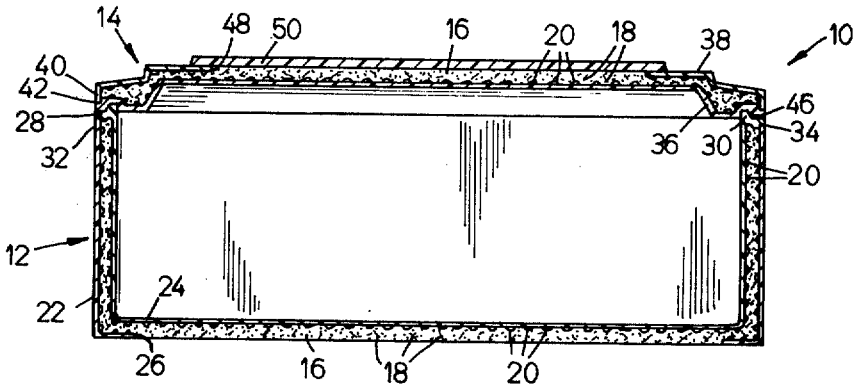
FIG. 12 is a side elevation view in section showing the burial vault after it has been filled with the cement-sand-stone composition.
Figure 13:
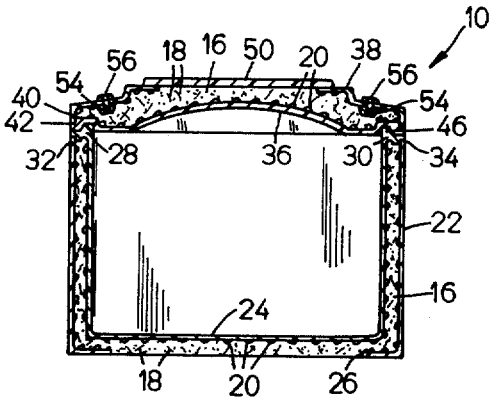
FIG. 13 is an end elevation view in section showing the burial vault after it is filled with the cement-sand-stone composition.
Figure 14:
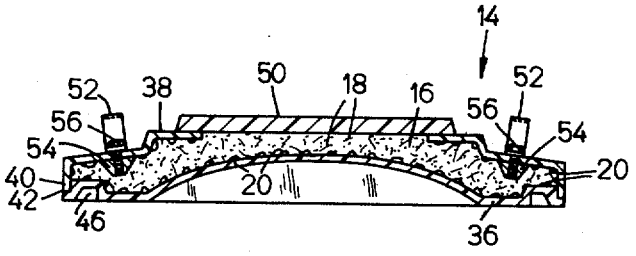
FIG. 14 is an enlarged end view in section of the cover after being filled with the cement-sand-stone composition.

More specifically, the base 12 is preformed by a conventional coating technique which involves coating a die with a layer of a gel coat material. A plastic resin and fiberglass is then applied onto the gel-coated die. The fiberglass resin layer is allowed to partially set. Anchor loops 20 of fiberglass are formed on the surface of the fiberglass resin liner by pulling the fiberglass away from the die. In this regard, the fiberglass will tend to adhere to the die and will be pulled away from the liner as shown in FIGS. 8 and 9. The liner is then allowed to set with the anchor loops projecting above the surface of the liner.

The base 12 is formed from two preformed sections, an outer liner wall 22 and an inner wall 24. The outer wall 22 includes an opening 26 in the base for filling the shell after assembly. The inner wall 22 includes a flange 28 around the upper edge of the inner wall which has an upper rib 30 designed for mating engagement with the cover 14 as described hereinafter. The inner wall is positioned within the outer wall with the upper edge 32 of the outer wall positioned in a notch 34 in the flange 28. A suitable resin composition is applied to the upper edge 32 of the outer wall in order to secure and seal the outer wall to the flange 28.

BURIAL VAULT COVER

The cover 14 is formed in substantially the same manner as the base and includes a bottom wall 36 and a top wall 38. Anchor loops 18 are formed on the upper surface of bottom wall 36 and on the inner surface of the top wall 38 in the same manner as the loops formed on the base. The cover 14 is formed by positioning the top wall 38 on the bottom wall 36 with the outer peripheral edge 40 of the wall 38 positioned in a notch 42 in the bottom wall 36. A suitable resin composition is used to secure and seal the top wall to the bottom wall. The bottom wall is also provided with a notch 46 which has a configuration corresponding to the upper rib 30 on the flange 28 to provide for sealing engagement between the cover and the base on assembly.

The top wall 38 of the cover is also provided with a filling opening 48 in the top. After the top has been filled with the cement-sand-stone composition, a panel 50 is secured to the top surface of the cover shell by a resin composition to close the opening 48 in the cover.

CEMENT-SAND-STONE COMPOSITION

The cement-sand-stone composition used to fill the cover and the base shells can be any conventional composition. In this regard, a cement composition having a cement-sand-stone ratio of 1 to 1½ and a water-cement ratio of 4½ gallons to 94 pounds of cement have been used satisfactorily. The sand-stone and cement should be mixed initially and the water added.

The tensile strength and crack-resistance of the cement-sand-stone composition when dried can be enhanced by adding short steel wires 18 to the cement-sand-stone composition as it is being mixed. These wires 18 are randomly arranged in the cement-sand-stone composition during the mixing process.

The use of such steel wires and the corresponding cement-sand-wire ratios are shown in the Romualdi patent 3,429,094, issued February 25, 1969, entitled "Two-Phase Concrete and Steel Material". The description of the various cement-sand-stone compositions are set forth therein and are incorporated herein by reference.

Handles 52 can be provided on the cover 14 by embedding threaded nuts 54 in the cement-sand-stone composition. This can be accomplished by merely supporting the nuts 54 on bolts 56 in the top wall of the cover. After the cement-sand-stone composition has set, the bolts 56 can be removed and the handles 52 secured to the cover by bolts 56.

I claim:

1. A burial vault comprising:

a hollow one-piece fiberglass resin shell having the shape of a base for a burial vault, a hollow one-piece fiberglass resin shell having the shape of a cover for said base, a cement-sand-stone composition completely filling each of said shells, and a number of fiberglass anchor loops within each of said shells and integral therewith for providing physical attachment between the set cement-sand-stone composition and the inner surface of said shells.

2. A vault according to claim 1 including a plurality of short steel wires in said cement-sand-stone composition.

3. A vault according to claim 1 wherein said base shell includes an opening at the top and a flange around the periphery of the opening in the base and said cover includes a groove around the periphery of the cover for matingly engaging the flange on said base.

4. A burial vault comprising a hollow walled rectangular shell preformed from a fiberglass resin composition, said shell including side walls and end walls closed at the top and a double-walled base having an inside wall connected to the bottom edge of the inner walls of said side walls and end walls to form a chamber for a coffin, and a base wall connected to the outer walls of said side walls and end walls in a spaced relation to said inner base wall, a hollow rectangular shaped cover shell preformed from a fiberglass resin composition, a cement-sand-stone and steel wire composition completely filling the shells and a plurality of fiberglass loops formed on the inner surface of the side walls, end walls and base walls for securing the cement-sand-stone and steel wire composition to the inner surfaces of the walls.

*5. A burial vault comprising a hollow rectangular shell preformed from a fiberglass resin composition, said shell including side walls, end walls and a base wall at the bottom closing the bottom of the side walls and end walls to form a chamber for a coffin,*

*a cement-sand-stone composition covering the outside surface of the side walls, end walls and base wall and a plurality of anchoring means partially embedded in the surface of the shell for mechanically locking the cement-sand-stone composition to the surfaces of the walls.*

*6. A vault according to claim 5 wherein said anchoring means comprises fiberglass loops.*

* * * * *